UNITED STATES PATENT OFFICE.

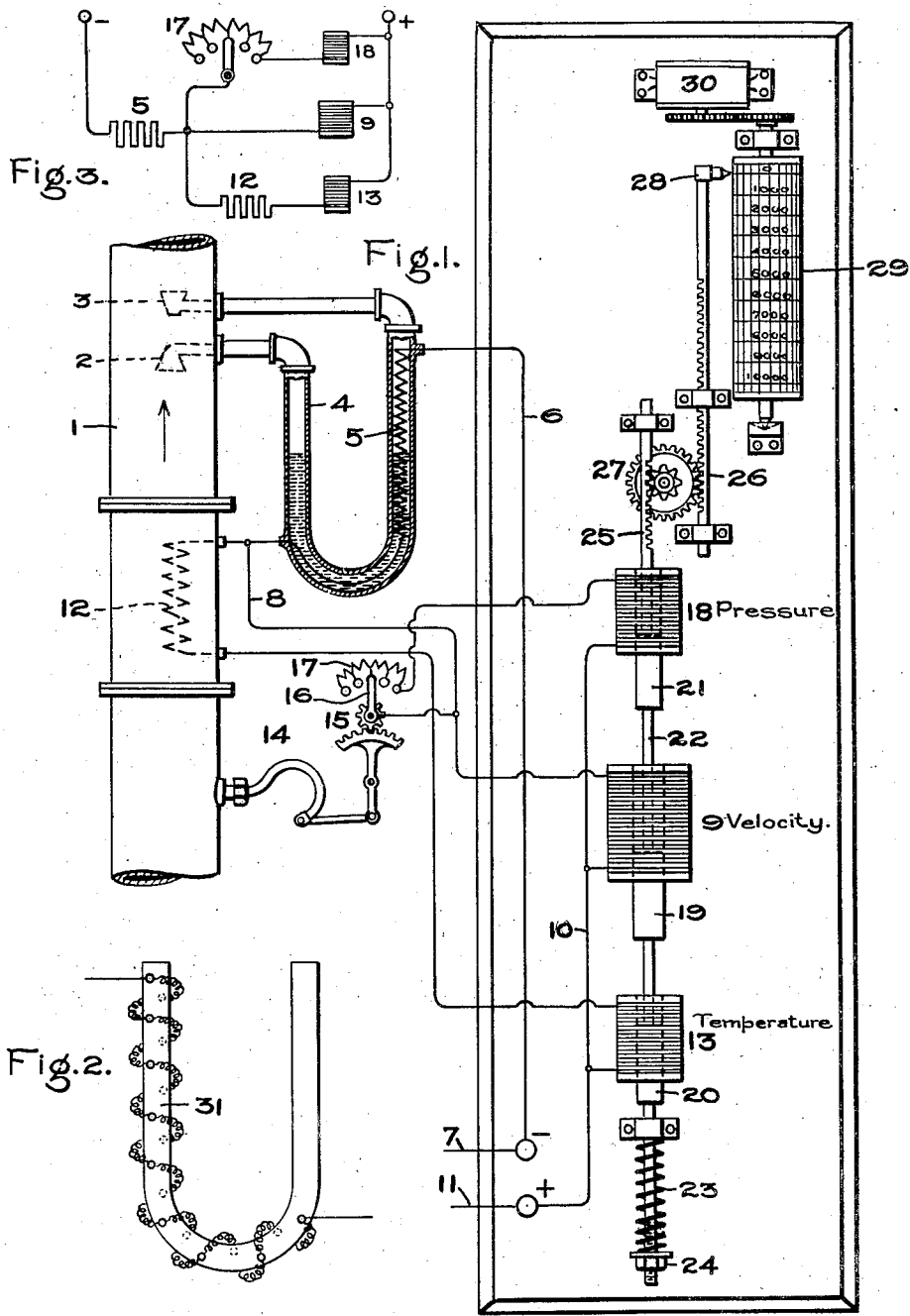

HAROLD H. MAPELSDEN, OF SCHENECTADY, NEW YORK, ASSIGNOR TO GENERAL ELECTRIC COMPANY, A CORPORATION OF NEW YORK.

FLUID-FLOW METER.

1,104,433.

Specification of Letters Patent.

Patented July 21, 1914.

Application filed July 17, 1909. Serial No. 508,106.

*To all whom it may concern:*

Be it known that I, HAROLD H. MAPELSDEN, a citizen of the United States, residing at Schenectady, county of Schenectady, State of New York, have invented certain new and useful Improvements in Fluid-Flow Meters, of which the following is a specification.

This invention relates to apparatus for indicating and recording the quantity of fluid flowing in a conduit. It is especially applicable to the measurement of steam flow and will hereinafter be described in that connection; though its usefulness is not confined thereto but may extend to the measurement of air or any other fluid.

The object of the invention is to simplify the structure of the instrument and render it possible to locate the indicating and recording mechanism in an engine-room or other station at a distance from the steam main, while the devices responsive to the velocity, temperature and pressure of the steam are located at the main and connected with the recording mechanism by a few insulated wires of any suitable length. The velocity - responsive device illustrated is a Pitot tube connected to a U-tube containing mercury which acts to cut out more or less of a resistance coil. The temperature-responsive device is a resistance coil whose resistivity varies with the steam temperature. The pressure-responsive device is a Bourdon tube, which actuates the switch-arm of a rheostat. The two resistance coils and the rheostat are respectively in circuit with three solenoids arranged with their axes in line and their cores attached to a common rod which actuates a pencil or pen coöperating with a moving record sheet. The combined effects of the currents in the three circuits determine the position of the pencil for any given velocity, pressure and superheat of the steam.

In the accompanying drawing, Figure 1 shows the invention diagrammatically; Fig. 2 illustrates a modification of the U-tube; and Fig. 3 is a simplified diagram of the circuits.

In the steam main 1 are located two small Pitot tubes or funnels 2, 3, one facing toward the flow and the other away from it. The funnels are connected respectively with the ends of a U-shaped tube 4 partly filled with mercury and containing in the low pressure leg a coil of wire 5, whose terminals are led out through the walls of the tube, one at the upper end of the low pressure leg and the other at a point near the bottom of the tube. The former terminal is connected by the conductor 6 with the negative line conductor 7, while the latter terminal is connected by the conductor 8 with a solenoid 9 connected by the wire 10 with the positive line conductor 11.

A metallic resistance coil 12 is located in the main 1; one terminal being connected to one end of the coil 5, and the other to a solenoid 13 in circuit with the positive lead 10.

A pressure-responsive device, preferably a Bourdon tube 14, is in communication with the main 1, its free end being mechanically connected, preferably by multiplying gearing 15, with the switch-arm 16 of a rheostat 17. The arm is connected with the lower terminal of the coil 5, while the rheostat coils are connected with a solenoid 18 in circuit with the positive lead 10.

The three solenoids 9, 13 and 18 are all in axial alinement, and their movable cores 19, 20, and 21 are all attached to a common rod 22. Each solenoid and core constitutes an electro-motive device. A spring 23, adjustable by means of a nut 24, draws said rod downward against the lift of the solenoids 9 and 18. The rod is connected, preferably through racks 25, 26 and gear wheels 27, with a pencil or marking device 28 adapted to draw a line upon a record sheet 29, which is preferably mounted on a cylinder driven by clockwork 30 at an even rate. The sheet is graduated to indicate steam flow of so many pounds in given increments of time.

The operation is as follows: The instrument is first adjusted when there is no steam in the main 1 and the solenoids 13, and 18 are out of circuit temporarily. With no steam flow the mercury will stand at the same level in both legs of the tube 4, and the resistivity of the coil 5 will be at a maximum, so that a current at a constant voltage of, say, 110 volts will produce a certain pull in the solenoid 9. By adjusting the tension of the spring 23 to balance this pull, the pencil 28 can be set at the zero mark on the record sheet. Now let saturated steam at a predetermined normal pressure, say 150 pounds gage, be admitted to the main; said steam having no superheat. This pressure will tend to straighten the Bourdon tube 14, thereby cutting out some of the rheostat coils 17 and permitting some current to flow through the solenoid 18 when its circuit is closed. This additional pull can be counterbalanced by a further tightening of the nut 24. Finally, let the steam be superheated to some predetermined normal temperature above that of saturated steam at 150 pounds gage pressure. This will heat up the coil 12 and increase its resistance, cutting down the current which would otherwise flow through it. Upon closing the circuit of the solenoid 13 it will exert a certain pull, but not so much as it would had the steam not been superheated. Adjustment for this weakened pull is made, so that the pencil will still stand at zero. The main is now assumed to contain superheated steam at normal pressure but not in motion. If then the throttle in the main be opened, the velocity of the moving stream of steam will affect the mercury column in the tube 4, causing it to rise in the right-hand leg and thereby cut down the resistivity of the coil 5. More current will, therefore, flow through the solenoid 9, whose pull is therefore increased, and the pencil will move down to indicate the weight of steam consumed in a given time. So long as there is no change in the pressure or the superheat, the velocity meter will properly indicate the amount of steam used. The more rapid the flow of steam, the higher will be the level of the mercury in the low pressure leg of the tube 4 and the lower will be the resistivity of the coil 5. The quantity of the steam flow thus determines directly the amount of current impressed upon the solenoid 9, whose core will be lifted to a corresponding height against the tension of the spring 23, while the pencil 28 will be pulled down to the proper point on the record sheet 29 to indicate and record the particular steam flow. This point will vary up and down as the flow decreases or increases, and the line drawn by the pencil on the sheet will form a graphic chart of the flow during a given time.

As is well known, the pressure difference set up by a Pitot tube bears a certain relation to the velocity and to the density of the steam. As pointed out above the meter is first calibrated for variations in velocity at constant density and so long as this constant density is maintained the meter will record correctly. If now, however, changes in density occur, as for example, by an increase or decrease in the superheat or a change in pressure or both, the deflection of the mercury in the U-tube will not be such as to correctly indicate the flow on a scale or record card which is calibrated for some other density. It is, therefore, necessary to correct for such changes, and to automatically make such corrections is the function of the pressure and temperature responsive devices. Assume for example that there is a change in density due to an increase in pressure. This would mean that there is a greater weight of steam flowing. The deflection of the U-tube, however, will not be such as to record correctly the flow at this new density and it is, therefore, necessary to correct for the same. In other words, for this new rate of flow at greater pressure, the meter would, were no correction made, record too little. As soon as the density increases, however, the Bourdon tube 14 causes the switch arm 16 to cut out more coils of the rheostat 17. More current will then flow through the solenoid 18 and thus strengthen the pull on the rod 22 which causes the pointer to indicate greater steam flow and thus correct for the change in density.

When the steam is superheated, its weight becomes less for a given pressure. To compensate or correct for superheat, therefore, the pull of the coils 9, 18 must be counterbalanced to the proper extent. This is accomplished by the solenoid 13 in circuit with the coil 12. With an increase in temperature the resistivity of the coil 12 increases, so as to weaken the current flowing through the solenoid 13, which thereupon permits the spring 23 to exert a downward pull on the rod and causes the pencil to indicate and record a lessened weight of steam. The instrument thus integrates the three factors of velocity, pressure and temperature, and indicates and records the result upon the properly graduated record sheet in terms of pounds of steam used per hour, or other selected interval of time.

In Fig. 1 the resistance coil 5 is shown as inserted into the tube 4. In practice, however, it is found preferable to wind the coil around the outside of the tube, and connect it at intervals to taps passing through the wall of the tube into the mercury contained therein. Such a structure is illustrated in Fig. 2, the leg 31 being the low pressure leg in this instance.

It will be observed that the three solenoids are in parallel branch circuits and that the velocity resistance coil 5 is in multiple-series with all three branches. The result of this is to preserve the ratios between the currents flowing in the three branches, irrespective of changes of velocity in the main, so long as the pressure and temperature remain constant; while any changes in such ratios due to variations in pressure and temperature will not be affected by changes in velocity. The actual amount of current flowing through all three branches will vary with the velocity, but the proportional amount in each branch will remain the same, so that the relative influence of each solenoid on the record will not be disturbed and will depend entirely upon the control exerted by its own responsive device.

While I have shown and described solenoids as the electromotive devices in my instrument, yet I wish it understood that other forms of such devices may be used if desired, and that the word "solenoid" in the specification and claims is intended to cover and include such other electromotive devices.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A meter for measuring the flow of elastic fluid through a main, said fluid being subject to changes in its condition, comprising a device responsive to the velocity of the flowing fluid, a device responsive to the static pressure in the main, a device responsive to the temperature of the flowing fluid, an indicating mechanism, and means whereby said mechanism can be jointly controlled by said three devices to determine the weight of fluid flowing through the main.

2. A flow meter for elastic fluids, comprising three electro-motive devices, a velocity-responsive device, a device responsive to static pressures, a temperature-responsive device, suitable means whereby said velocity, pressure, and temperature-responsive devices respectively control said electro-motive devices, an indicator, and means whereby said indicator is controlled by all of said electromotive devices.

3. A flow meter, comprising three solenoids, a velocity-responsive device, a pressure-responsive device, a temperature-responsive device, suitable means whereby said velocity, pressure and temperature-responsive devices respectively control said solenoids, a movable rod common to all of said solenoids, an indicator, and means whereby the indicator is moved by the rod.

4. A flow meter, comprising three solenoids in axial alinement, a movable core for each, a common rod carrying all of said cores, an indicating and recording mechanism actuated in part by said rod, a velocity-responsive device in circuit with one solenoid, a pressure-responsive device in circuit with another, and a temperature-responsive device in circuit with the third.

5. A flow meter, comprising three electromotive devices, an indicator common to all, means connecting said indicator and electromotive devices, three resistance coils respectively in circuit with said devices, and devices respectively responsive to the velocity and pressure of the fluid, and each controlling one of said resistance coils, said third coil being directly influenced by the temperature of said fluid.

6. A fluid flow meter, comprising three electro-motive devices in multiple, an indicator, means whereby said indicator is controlled by all said devices, two resistance coils respectively in series with two of said devices, a third resistance coil in multiple-series with all three, a velocity-responsive device controlling said latter coil, and a pressure-responsive device controlling one of said other coils.

7. The combination with a steam main, of three resistance coils, one within said main, a velocity-responsive device and a pressure-responsive device respectively controlling said other coils, electromotive devices in circuit with said coils, a common indicator, and means whereby the indicator is controlled by said electromotive devices.

8. The combination with a steam main of a device responsive to the velocity of flow of the steam through the main, a device responsive to the static pressure of the steam in the main, a device responsive to the temperature of the steam, said devices being all in or adjacent to the main, a distant indicating mechanism comprising electro-motive means controlled by each of said devices, and electric connections between the devices and said means whereby the indicating mechanism is controlled by said devices and caused to indicate the weight of steam flowing through the main.

9. The combination with a steam main, of a Pitot tube device containing mercury, said device being connected to the main so that the velocity of the flowing steam causes a movement of the mercury therein, a resistance coil adapted to have its turns short circuited by the mercury, a Bourdon tube connected to the main so as to be affected by the pressure of the steam, a rheostat controlled by said tube, a resistance coil exposed to the heat of the steam, three solenoids respectively in circuit with said resistances, a common core-carrying rod for said solenoids, an indicating and recording mechanism, and means whereby said rod coöperates with said mechanism.

10. In a fluid flow meter, the combination with three solenoids arranged in axial alinement, of a rod carrying the cores of said solenoids, an adjustable spring connected with said rod, a rack on said rod, gearing meshing with said rack, a second rack engaging with said gearing, and recording mechanism coöperating with said second rack.

11. A meter for measuring the flow of elastic fluid through a main, comprising an electrical indicating device, resistance means in circuit with the device and adapted to vary its action, means responsive to the velocity of flow of the fluid through the main for varying the resistance, and means responsive to changes in a physical condition of the fluid flowing through the main for also varying the resistance.

12. A meter for measuring the flow of elastic fluid through a main, comprising an electrical indicating device, resistance means in circuit with said device and adapted to vary its action, an agent located in said main that creates a pressure difference whose value bears a definite relation to the rate of flow of the fluid, means responsive to changes in the pressure difference created by said agent for varying said resistance, and further means responsive to changes in the temperature and pressure of the fluid for varying said resistance.

13. A meter for measuring the flow of elastic fluid through a main, comprising an electrical indicating device, resistance means in circuit with said device and adapted to vary its action, an agent located in said main that creates a pressure difference whose value bears a definite relation to the rate of flow of the fluid, means responsive to changes in the pressure difference created by said agent for varying said resistance, and further means responsive to a change in a condition of the fluid for varying said resistance.

In witness whereof, I have hereunto set my hand this 15th day of July, 1909.

HAROLD H. MAPELSDEN.

Witnesses:
  HELEN ORFORD.
  W. G. GARTNER.